US008570896B2

(12) United States Patent
Bugenhagen (10) Patent No.: US 8,570,896 B2
(45) Date of Patent: *Oct. 29, 2013

(54) SYSTEM AND METHOD FOR CONTROLLING THRESHOLD TESTING WITHIN A NETWORK (71) Applicant: Michael K. Bugenhagen, Overland Park, KS (US)

(72) Inventor: Michael K. Bugenhagen, Overland Park, KS (US)

(73) Assignee: CenturyLink Intellectual Property LLC, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 13/674,467

(22) Filed: Nov. 12, 2012

(65) Prior Publication Data
US 2013/0070590 A1 Mar. 21, 2013

Related U.S. Application Data (63) Continuation of application No. 12/389,277, filed on Feb. 19, 2009, now Pat. No. 8,315,179.

(60) Provisional application No. 61/066,252, filed on Feb. 19, 2008.

(51) Int. Cl.
G06F 11/30 (2006.01)
(52) U.S. Cl.
USPC ...... 370/252; 370/230; 370/395.21; 370/465; 370/412; 709/235
(58) Field of Classification Search
USPC ............ 370/229–237, 248, 252, 395.21, 465, 370/412, 389; 714/43, 27; 379/22; 725/93; 709/232, 224, 235
See application file for complete search history.

(56) References Cited

U.S. PATENT DOCUMENTS

| 5,726,977 | A | 3/1998 | Lee |
| 6,446,222 | B1 | 9/2002 | Phaal |
| 6,618,360 | B1 | 9/2003 | Scoville et al. |
| 6,839,767 | B1 | 1/2005 | Davies et al. |
| 7,012,893 | B2 | 3/2006 | Bahadiroglu |
| 7,085,236 | B2 * | 8/2006 | Oldak et al. ............... 370/235.1 |
| 7,643,414 | B1 | 1/2010 | Minhazuddin |
| 7,995,574 | B2 * | 8/2011 | Suri ............................. 370/389 |
| 8,015,602 | B2 | 9/2011 | Ormazabal |
| 2003/0063564 | A1 | 4/2003 | Ha et al. |
| 2003/0149785 | A1 | 8/2003 | Gerla et al. |
| 2004/0003070 | A1 | 1/2004 | Fernald et al. |
| 2004/0073690 | A1 | 4/2004 | Hepworth et al. |
| 2004/0120252 | A1 | 6/2004 | Bowen et al. |
| 2005/0047340 | A1 | 3/2005 | Babiarz et al. |
| 2005/0281392 | A1 | 12/2005 | Weeks et al. |

(Continued)

OTHER PUBLICATIONS

Bradner et al. Benchmark Methodology for network interconnect devices, 1999, p. 1-31.

Primary Examiner — Michael Thier
Assistant Examiner — Vincelas Louis
(74) Attorney, Agent, or Firm — Patton Boggs LLP (57) ABSTRACT A system and method for authorizing test traffic over a network. A request is received to perform a throughput test. A state of the network is determined. The throughput test is authorized in response to the determined state of the network being acceptable for performing the throughput test. The throughput test is terminated or paused in response to the determined state of the network being unacceptable for performing the throughput test.

20 Claims, 4 Drawing Sheets

(56) References Cited

U.S. PATENT DOCUMENTS

| | | |
|---|---|---|
| 2006/0187836 A1* | 8/2006 | Frey et al. .................... 370/235 |
| 2007/0041326 A1 | 2/2007 | Babiarz et al. |
| 2008/0181123 A1* | 7/2008 | Huang et al. ................ 370/252 |
| 2008/0225704 A1 | 9/2008 | Sheinfeld et al. |
| 2009/0100294 A1 | 4/2009 | Fellenstein et al. |
| 2009/0113045 A1 | 4/2009 | Kozisek |
| 2009/0323551 A1 | 12/2009 | Croak et al. |
| 2011/0047582 A1 | 2/2011 | Greene et al. |

* cited by examiner

SYSTEM AND METHOD FOR CONTROLLING THRESHOLD TESTING WITHIN A NETWORK

CROSS-REFERENCE TO RELATED APPLICATIONS

This application is a continuation of application Ser. No. 12/389,277, entitled System and Method for Authorizing Threshold Testing within a Network, filed on Feb. 19, 2009, which claims priority to provisional application Ser. No. 61/066,252, filed on Feb. 19, 2008, entitled: System and Method for Bandwidth Oriented Performance Management, and which is incorporated herein by reference.

BACKGROUND

Currently, various methods of testing the throughput performance of a packet network, such as a request for comment (RFC) 2544 testing, utilize test patterns of test packets that are communicated across a network. For example, test packets marked with a lower quality of service may be utilized for the testing of the in-service network such that a higher quality of service traffic will remain prioritized over such test patterns of packets. In such a manner, additional traffic loads may be added to network traffic to determine throughput performance problems with a particular network segment, node, or device.

However, the use of test packets with quality of service marking matching live traffic to load the network may themselves cause network congestion and network failure that disrupts the use of services of customers utilizing the network undergoing testing. Currently, network elements have no discernable means of identifying what network traffic is associated with test patterns as compared to network traffic servicing real customer applications. As a result, the network customer has no ability to remove testing traffic causing a performance issue with the network.

SUMMARY

One embodiment includes a system and method for authorizing test traffic over a network. A request may be received to perform a throughput test. A state of the network may be determined. The throughput test may be authorized in response to the determined state of the network being acceptable for performing the throughput test. The throughput test may be terminated or paused in response to the determined state of the network being unacceptable for performing the throughput test.

Another embodiment provides a system for authorizing bandwidth testing in a network. The system may include a network operable to facilitate communications between a multiple nodes. The system may also include a test controller in communication with the network. The test controller may be operable to receive a request to perform a bandwidth test from one or more of the multiple nodes from a node to perform a bandwidth test. The test controller may be operable to determine whether one or more portions of the network are congested. The test controller may be further operable to authorize the throughput test in response to the network congestion being below a threshold.

Yet another embodiment provides a network node. The network node may include a processor for executing a set of instructions and a memory for storing the set of instructions. The set of instructions may be operable to receive a request to perform a throughput test, determine a state of the network, authorize the throughput test in response to the determined state of the network being acceptable for performing the throughput test, and terminate or suspend the throughput test in response to the determined state of the network being unacceptable for performing the throughput test.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

An illustrative embodiment provides a system and method that may be utilized to authorize test traffic within a network. In one embodiment, a testing client, device, equipment, service, or party may be required to register with a testing device before receiving authorization to send test traffic. The test traffic may include a bandwidth or throughput test through and/or within a communications network. During the testing process, the testing device may terminate testing at any time in response to determining the test traffic may cause or result in congestion, high utilization, or potential network failure. The testing may be delayed or terminated until reauthorized by the testing device.

Figure 1:
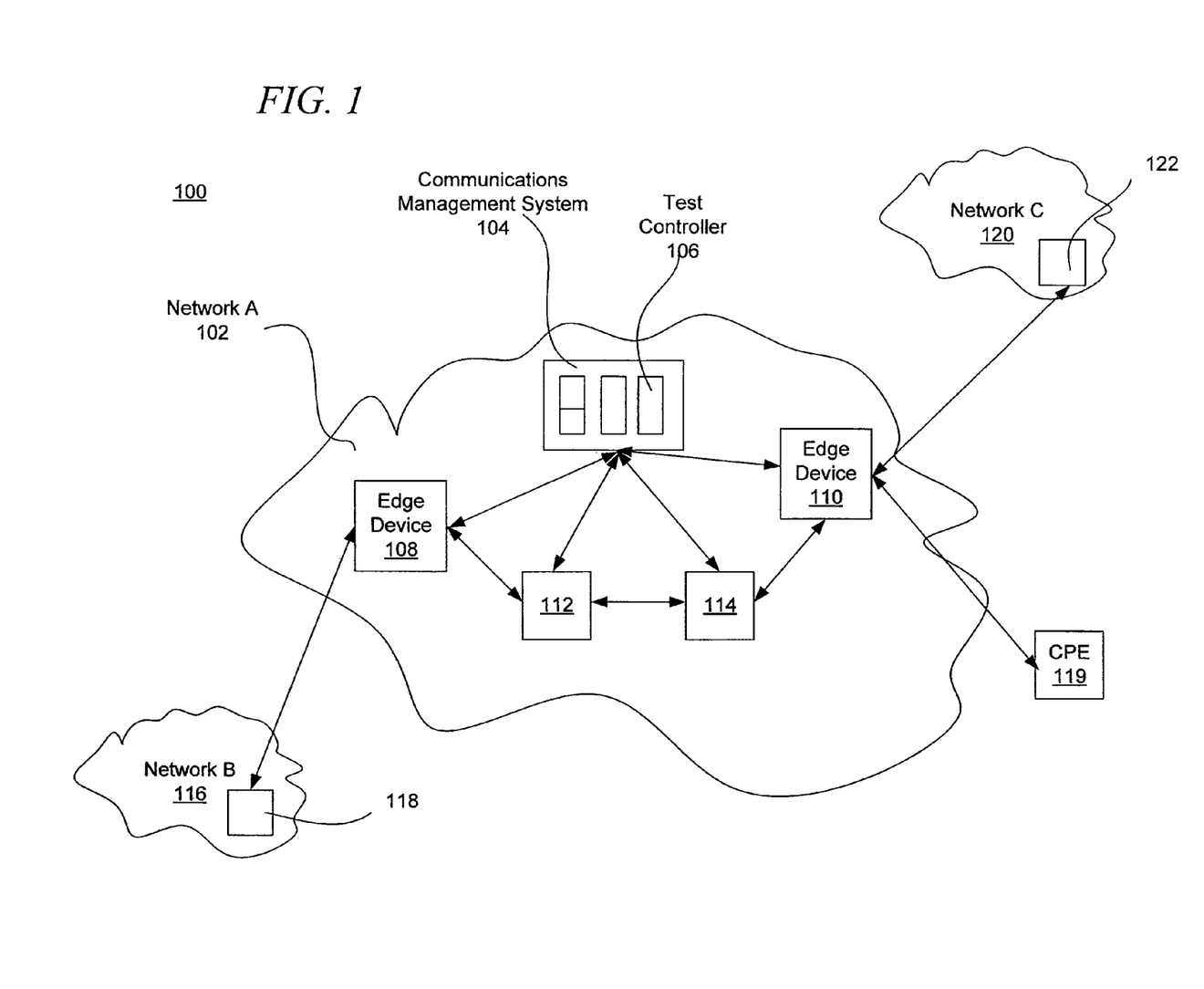
FIG. 1 is a pictorial representation of a communications environment in accordance with an illustrative embodiment.

FIG. 1 is a pictorial representation of a communications environment in accordance with the illustrative embodiment. FIG. 1 is one embodiment of a communications environment 100. The communications environment 100 is one or more networks, network users, communications systems, equipment, devices, and connections that enable communications. The communications environment 100 may be utilized for analog, data, packet, and voice communications utilizing any number of standards and protocols.

The communications environment 100 may include any number of devices, equipment, and systems. In one embodiment, the communications environment 100 may include network A 102, a communications management system 104, a test controller 106, edge devices 108 and 110, nodes 112 and 114, network B 116, node 118, customer premise equipment (CPE) 119, network C 120, and node 122. Network A 102, network B 116 and network C 120 may represent one or more communications service providers. In another embodiment, each of the networks may be operated by a single communications service provider with one or more operational organizations having the ability to initiate tests. In one embodiment, the networks and corresponding nodes and devices may be a portion of a Metro Ethernet network or ring. In another embodiment, the corresponding nodes and devices may be a portion of an Internet Protocol (IP) or IP multi-protocol label switching network.

The Ethernet network construct may be any topology, structure, or design suitable for communication, such as ring, hub-and-spoke, star, point-to-point, full mesh, partial mesh, or other Ethernet architectures. The Ethernet ring may be part of a communications network that may utilize a hierarchy, including a core, distribution, and access. For example, the core may be the backbone of the communications network for communicating signals, data, and information from one point to another.

The communications management system 104 is one or more devices utilized to enable, initiate, route, and manage communications between one, or more telephonic, CPE, or packet devices. In one embodiment, the communications management system 104 may be integrated or contained within the network nodes of the communications environment 100 as a control plane management protocol. In another embodiment, the communications management system 104 may be external to the network nodes. The communications management system 104 may include one, or more devices networked to manage the communications network A 102. For example, the communications management system 104 may include any number of servers, routers, switches, computing devices, or advanced intelligent network devices, including the edge devices 108 and 110 and nodes 112 and 114. The edge devices 108 are interfaces between network A 102 and other networks, connections, or users. The nodes 112 and 114 are examples of numerous intermediary devices that may be part of the communications network.

The communications management system 104 may also include the test controller 106. The test controller 106 is an authorization agent for managing and controlling test traffic, patterns, and packets in network A 102. In one embodiment, the test controller 106 may coordinate, authorized, pause, and terminate all testing with the network A 102. In one embodiment, the test controller 106 is a physical device, such as a server that authorizes testing. In another embodiment, the test controller 106 is an application or instructions that authorize testing and the associated test traffic inside of the network control plane. Another embodiment provides test capable clients and elements that request clearance from the centralized test controller prior to running network tests that may negatively impair or load the network. For example, the edge device 108 may execute an application that interfaces with the test controller 106 to authorize testing by the edge device 108 or testing by the node 118 from an external network. For example, the node 118 may be a device, such as a DSL or FTP server, that provides throughput testing. For example, the FTP server may perform a bandwidth test through network B 116, as well as, network A 102 and network C 120. In another embodiment, the test controller 106 is a domain device that approves or denies testing requests or attempts from RFC 2544 devices.

As a result, all testing clients that can impair the network contain "test clients" that prior to tests initiated within the network by a device, client, or application, such as intermediary device 112, require authorization from the test controller device 106 before testing may be initiated. In another embodiment, test controller device 106 can receive information that the network is congested, and automatically send a "test suspend" message to any active clients to suspend testing. This command can be triggered either manually or automatically based upon operational or system inputs to the test control device.

In another embodiment, the test controller 106 may communicate test packets through the devices, nodes, and connections of the networks of the communications environment 100. For example, the test controller 106 may send packets to the nodes 112, 114, 118 and 122 and edge devices 108 and 110 to test and evaluate network A 102, network B 116, and network C 120, as well as, specific parts, connections, devices, equipment, system, modules, and components. For example, the test packets may be sent and/or received from the nodes 112, 114, 118 and 122 to determine performance criteria and characteristics, such as throughput, latency, delay, jitter, packet loss, and other similar information. The test packets may be sent individually or as a pattern for analysis and evaluation. It is important to recognize that the testing system or communications management system 104 location is not restricted to an internal network or portions of a network management system. In some embodiments, applicable test devices, such as the test controller 106, may be located both centrally and/or at customer locations and may operate independently.

The communications network A 102 sends and receives the electronic signals through any number of transmission mediums. The communications network A 102 may include various fiber optics, cables, transmission towers, antennas, or other elements for transmitting voice communications to the connected communications or computing telephonic devices. In a preferred embodiment, the communications management system 104 and the communications network A 102 work to transmit packets for data traffic and voice communications through voice over Internet Protocol (VoIP) phones. However, the communications network A 102 and communications management system 104 may enable plain old telephone service (POTS), wireless service, or other forms of communications.

The CPE 119 is a device for allowing a user to communicate with the network A 102 through a communications link. The communications link may be a wired or wireless connection. For example, the connection may be Ethernet, fiber optics, cable, DSL, WiFi, WiMAX, CDMA, TDMA, GSM, GSMR, satellite, or any number of other communications connection types utilizing any number of standards and protocols. The CPE 119 may be a modem, router, switch, personal computer, server, or other device operated by the customer. One CPE 119 is shown for purposes of simplicity, but any number of customers and other users may communicate with network A 102, network B 116, and network C 120.

Network B 116 and network C 120 may also include one or more communications management systems or controlling devices, systems, or equipment. The method of the illustrative embodiments may be implemented by any of the devices and nodes within the communications environment 100. In one embodiment, each device may determine whether the network is congested or suffering failure. In another embodiment, information regarding congestion may be communicated to each device from the communications management system 104 or an equivalent device for the network A 102, network B 116, and network C 120 via internal or external operational domain protocols or management systems.

Once network A 102 is determined to be congested, degraded, running at too high of a utilization, or one or more portions of the network are in failure or suffering other throughput or capacity issues, a specified action is taken with regard to the acceptance and transmission of test packets within the network A 102. For example, test packets may be filtered or rejected at the edge ports of network 102. In the event there is an alternative route for test packets, the network A 102 may be determined to not be congested. Operational and performance thresholds may be specified for automatic detection of congestion, and triggering of specified test packet handling actions. For example, if DSLAM trunk utilization exceeds 60% the communications management system 104 may provide an alert to network operations personnel. Once the DSLAM trunk utilization exceeds 80%, test packet removal may be automatically initiated for the network A 102 or an alert suggesting activation of a test packet filtering or rejection feature may be sent to one or more users. In another embodiment, automatic test packet removal and deletion may begin in response to sensing packet discards on a protected path within the network A 102.

In one embodiment, a user in communication with the communications management system 104 may manually select to activate test packet handling actions. For example, the communications management system 104 may be part of a network operation center (NOC) or central office with any number of user terminals. A network operations manager or other user may provide user input or a command to initiate different test packet acceptance states for the network. The user input may be a verbal, textual, or data selection or command.

In another embodiment, the user may access an application, user interface, or portal stored and executed by the communications management system 104 to delete the test packets. Various actions may be taken based on the location or portion of the network experiencing congestion. In one embodiment, the testing packets are deleted. In another embodiment, the test packets are queued until the network A 102 is no longer congested. The test packets may also be rerouted or redirected to the sending device with information. The information may specify why the test cannot be completed, where the congestion is occurring, and any other information that may be useful to other networks, administrators, or users. In another embodiment, a response packet may be generated and sent to the applicable sending device or system with the information included in the header or other data portion of the response packet.

In one embodiment, one or more test packets may originate from a separate network, such as network B 116 for communication to or through the network A 102. The edge devices 108 and 110 may act to filter or otherwise remove test packets in response to a determination that network A 102 is congested. As a result, congestions within network A 102 is not further aggravated by test packets, traffic, or patterns that may further degrade the performance of network A 102. In another embodiment, the test packets may originate from within network A 102 from a device, such as test controller 106.

Figure 2:
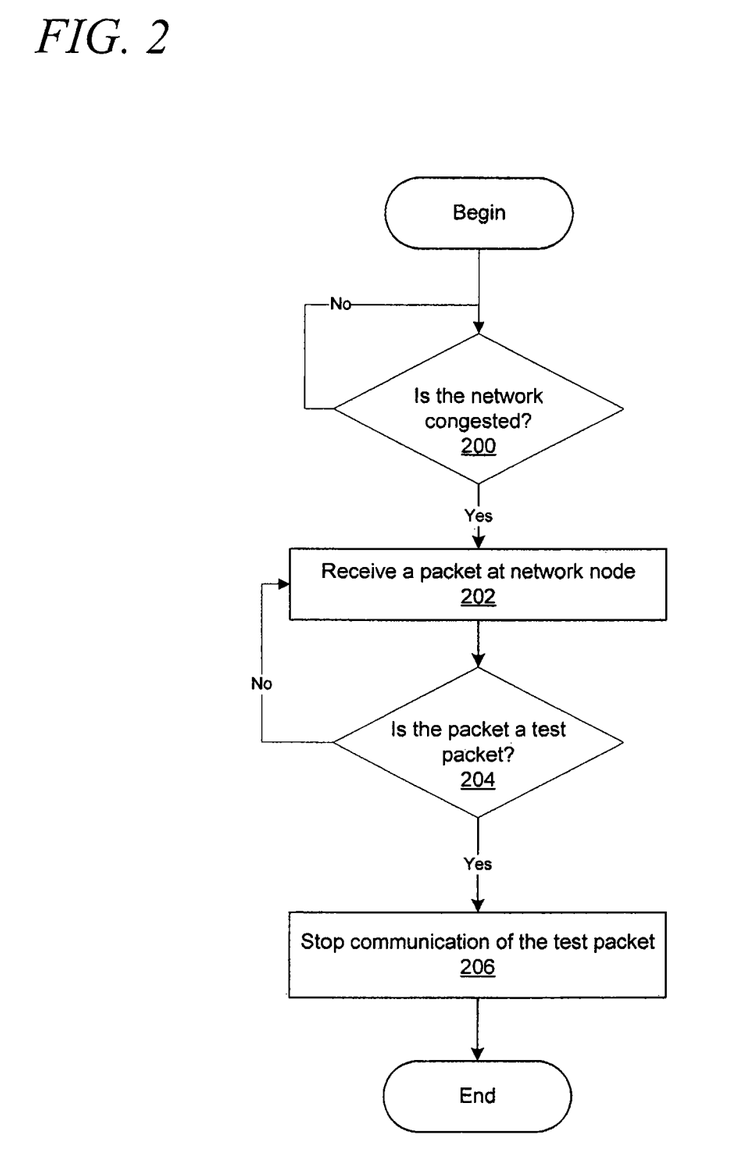
FIG. 2 is a flowchart of a process for removing test packets from a network in accordance with an illustrative embodiment.

FIG. 2 is a flowchart of a process for removing test packets from a network in accordance with an illustrative embodiment. The process of FIG. 2 may be implemented by any number of network nodes, devices, systems, networks, customers, or equipments. The process may begin by determining whether the network is congested (step 200). The network, segment, node, or device may be determined to be congested, degraded, or suffering performance issues based on information from packet counters, latency determinations, packet loss determinations, or any other suitable means. If the network is not congested, the network node repeatedly determines whether the network is congested (step 200).

If the network node determines the network is congested in step 200, the network node receives a packet at a network node (step 202). The network node may be any portion of a communications system or network. The device may be controlled by a communications service provider or customer.

Next, the network node determines whether the packet is a test packet (step 204). The determination of step 204 may be made in response to a particular flag, or other marking or indicia, within the packet itself. For example, a particular field of a packet header or body may be added, modified, transformed, or appended to designate the packet as an individual test packet or as a packet within a test pattern. In one embodiment, a packet may be marked with a particular quality of service indicator associated with testing. In yet another embodiment, the packet may be addressed to a particular network address associated with testing. In yet another embodiment, the packet may be specific types of protocols with unique attributes that identify the packet as a test packet. In yet another embodiment, the packet may be sent to a particular port associated with testing. In such a manner, a packet sniffer, or other hardware or software process or component may be utilized in order to discern or distinguish packets associated with test patterns from other network traffic. Each test packet may be automatically marked when generated or upon entering the network. For example, edge devices within the network may mark test packets generated by other communications service providers or entering from other networks. In another example, test controllers may utilize a standard working protocol to indicate a packet is a test packet.

If the packet is not a test packet, the network node returns again to receive a packet at the network node (step 202). In other words, the network node analyzes a subsequent packet communicated within the network, link, line, or system. In one embodiment, the network node may evaluate or analyze each packet communicated. In another embodiment, the network node may randomly test packets. In yet another embodiment, the network node may periodically test nodes at specified intervals or thresholds.

If the packet is a test packet in step 204, the network node stops communication of the test packet (step 206). In step 206, the packet may be deleted, queued, removed from a queue, not forwarded, returned to a sending device or party, stored, paused, or otherwise stopped or prevented from being communicated based on network settings.

In such a manner, whether or not a packet that is part of a test pattern is communicated over a particular network segment, across a network node, or by a particular network device, depends on the state of the network. More specifically, centralized or local state engines may be utilized that indicates whether the network is suffering congestion or whether no congestion exists. A flag, trigger, update, communication, or any other suitable means may be utilized to indicate that the network is or is not congested. For example, a central network resource may periodically notify network nodes or network end-points when the network is experiencing congestion. Likewise, such functionality notification can be distributed across many nodes of the network or a determination may be made at each network node. Even in cases where an overall network is not congested, a particular network path, segment, node, or device may be indicated as being congested, such that packets that are part of a test pattern will not be communicated across or through the congested portion of the network.

Figure 3:
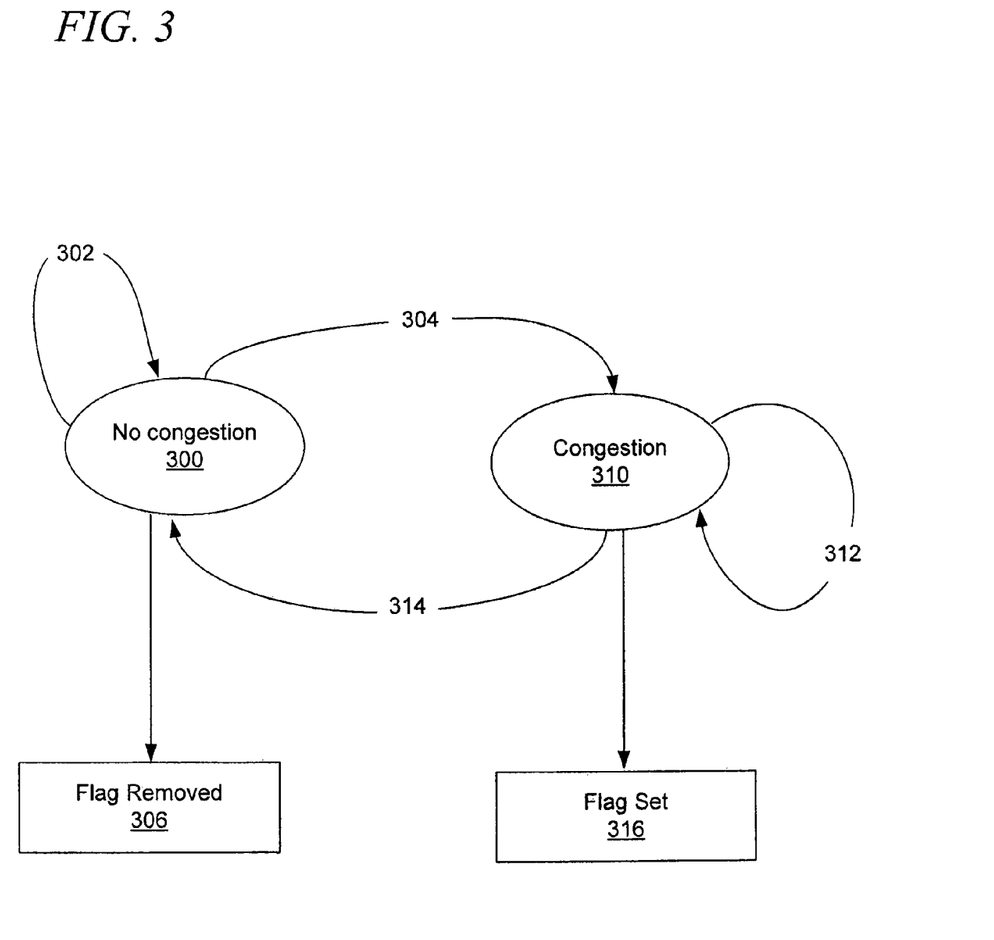
FIG. 3 is a state diagram for removing test packets in accordance with an illustrative embodiment.

FIG. 3 is a state diagram for removing test packets in accordance with an illustrative embodiment. FIG. 3 illustrates two states of a test pattern state engine that may be utilized by a customer, network, or device. The states may be implemented by digital logic or stored as instructions within a memory for execution by a processor.

The processor is circuitry or logic enabled to control execution of a set of instructions. The processor may be a microprocessor, digital signal processor, central processing unit, or other device suitable for controlling an electronic device including one or more hardware and software elements, executing software, instructions, programs, and applications, converting and processing signals and information, and performing other related tasks. The processor may be a single chip or integrated with other computing or communications elements.

The memory is a hardware element, device, or recording media configured to store data for subsequent retrieval or access at a later time. The memory may be static or dynamic memory. The memory may include a hard disk, random access memory, cache, removable media drive, mass storage, or configuration suitable as storage for data, instructions, and information. In one embodiment, the memory and processor may be integrated. The memory may use any type of volatile or non-volatile storage techniques and mediums. The node may include digital logic or a set of instructions that include the test pattern state engine. The node may further include other computing and telecommunications elements that typically include busses, motherboards, circuits, ports, interfaces, cards, connections, transceivers, displays, antennas, and other similar components.

In state 300, no network congestion exists. In state 310, network congestion does exist. If no congestion currently exists such that the network is in no congestion state 300, the network may periodically update such state based on new information regarding the existence of congestion. The congestion information may be determined by the node or device that transitions between states. In another embodiment, the congestion information may be received from a remote device or communications management system in communication with the network.

In step 302, the network determines that no congestion is occurring leaving the network to remain in no congestion state 300. In step 304, an indication that there is network congestion detected causes a change of state to congestion state 310. Network congestion may be determined as described herein or based on criteria, logic, and factors specified by a customer or communication service provider.

When the network is in congestion state 310 and a determination is made, the network remains congested, in step 312 the network determines that congestion state 310 should be maintained. In step 314, if a determination is made that the network is no longer congested, the network determines that a change should be made to the no congestion state 300.

In one embodiment, the test pattern state engine may generally cause or set an indication or identifier while in congestion state 310 such as setting a flag in flag step 316. Alternatively, if no congestion state 300 exists, a flag may be changed or removed in step 306. Although not illustrated herein, an update, notification, packet communication, or other indicia can be utilized to notify all or portions of a network that a particular congestion state exists.

Figure 4:
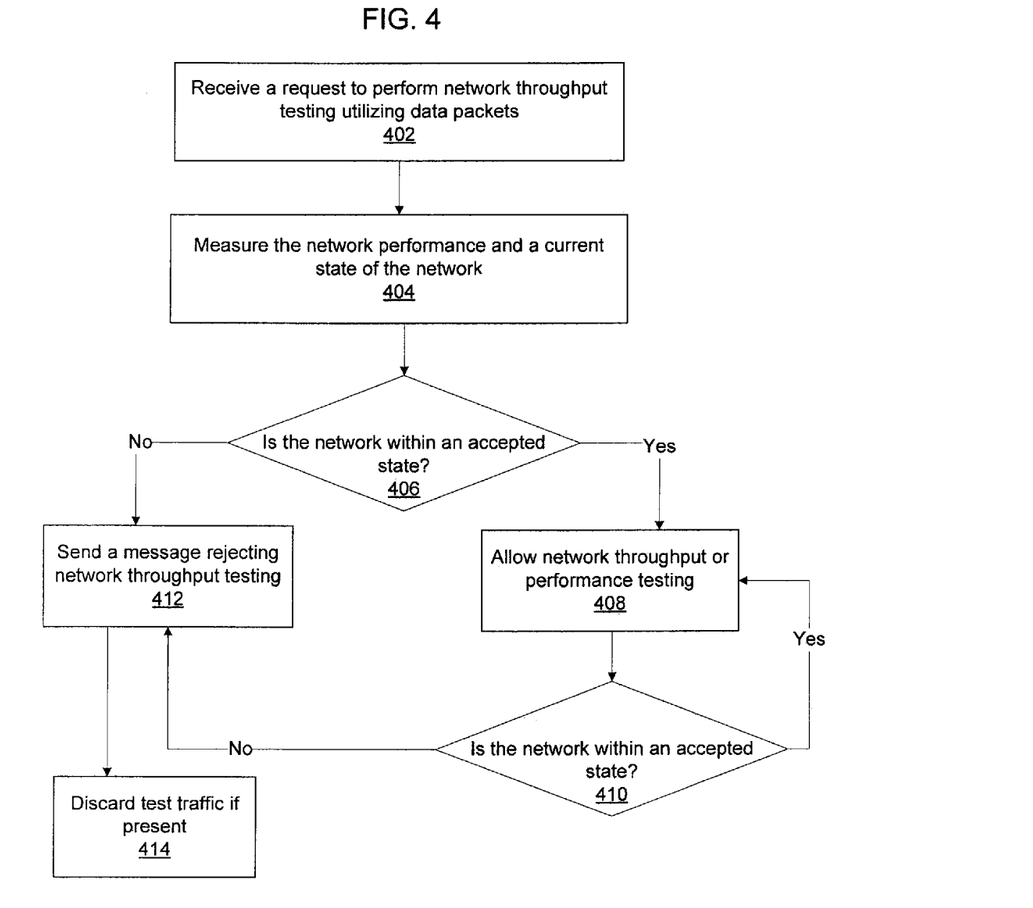
FIG. 4 is a flowchart of a process for managing network throughput testing in accordance with an illustrative embodiment.

FIG. 4 is a flowchart of a process for managing network throughput testing in accordance with an illustrative embodiment. The process of FIG. 4 may be implemented by any number of network devices, systems, controls, or managers referred to as a test controller. The testing may be a protocol or benchmark, such as request for comment (RFC) 2544 that may test throughput, latency, frame loss rate, back-to-back frames, system recovery, rest, and other testing parameters.

In one embodiment, the test controller may receive a request to perform network throughput testing utilizing data packets (step 402). The request may be received from a customer, communications service provider, separate network, operators, or other devices, systems, or individuals. The test controller may be an application that communicates with another application, script, or program to determine whether test traffic and packets may be communicated within or across the network and corresponding devices. In one embodiment, any devices, applications, or other elements that perform network testing may be required to be registered with the test controller in order to establish a master-slave relationship that allows the test controller to manage test traffic.

Next, the test controller measures the network performance and a current state of the network (step 404). During step 404, the state of the network may be determined utilizing any number of states, thresholds, and parameters. The network performance may indicate bandwidth and network utilization, loss, congestion, and other relevant information for specific legs, between endpoints, or for other portions of the network.

Next, the test controller determines whether the network is within an accepted state (step 406). The accepted state may indicate that the operators, devices, or elements of the network are or are not compliant with operational parameters. In one embodiment, the network may be within an accepted state when network utilization is below a threshold, such as 75% of capacity. The state may also be determined by network utilization that indicates whether the network is nearing a maximum capacity. For example, the networking nearing maximum capacity may indicate that the test controller is not in an acceptable state. The state may also be determined based on congestion, network failures, or time of day limitations. Alternatively, the threshold may be set relatively low so that testing is only permitted during off-peak time periods, such as at night.

If the network is within an accepted state in step 406, the test controller allows network throughput or performance testing (step 408). The network throughput testing may be any number of testing formats, such as RFC 2544 bandwidth testing. During step 408, the test controller may allow test packets and test patterns to be communicated in and through the network as controlled by the test controller. In one embodiment, a group of test devices may function together to control testing for all or portions of a network.

Next, the test controller determines whether the network is within an accepted state (410). If the network is within an accepted state, the test controller continues to allow network throughput testing (step 408). In steps 406 and 410, determinations that the network is not within an accepted state may indicate that the network is experiencing congestion that may be exacerbated by the artificially introduced test traffic.

If the network is not within an accepted state in step 410, the test controller sends a message rejecting network throughput testing (step 412). The message may be sent so that stress testing, test traffic, or other forms of testing are terminated or ceased within the network based on network changes or other negative effects of testing.

Next, the test controller discards test traffic, if present (step 414). The test controller may remove traffic determined to be test traffic based on markings, indicia or other determinations. The test traffic may be removed to further alleviate loss or congestions that may be occurring within the network. In one embodiment, test traffic may not be discarded in step 414, but rather may be temporarily paused, queued, or buffered until such time as the network is within an acceptable state so that the network/throughput test(s) may resume.

The previous detailed description is of a small number of embodiments for implementing the invention and is not intended to be limiting in scope. The following claims set forth a number of the embodiments of the invention disclosed with greater particularity.

What is claimed:

1. A method of authorizing test traffic over a network of a first service provider, the method comprising:
   receiving a request to perform a throughput test from one or more testing clients;
   determining a state of the network utilizing indicators received from a plurality of portions of the network;
   authorizing the throughput test in response to the determined state of the network being acceptable for performing the throughput test;

registering the one or more testing clients with a test controller in response to the test controller authorizing the throughput test; and pausing the throughput test through the one or more testing clients registered with the test controller in response to the determined state of the network being unacceptable for performing the throughput test, wherein pausing the throughput test includes queuing packets associated with the throughput test at an edge device of the network, the edge device of the network in communication with a second edge device of a second network of a second service provider, wherein the edge device of the network queues the packets associated with the throughput test received from the second network to until the determined state of the network is determined to be acceptable for performing the throughput test.

2. The method according to claim 1, wherein the network is a Metro Ethernet network, and wherein the state of the network is determined to be unacceptable for performing the throughput test in response to packets being discarded along a path within the network.

3. The method according to claim 1, wherein the test controller reauthorizes the throughput test in response to the determined state of the network being acceptable.

4. The method according to claim 3, wherein the network utilization is determined based on one or more thresholds.

5. The method according to claim 1, wherein the state of the network being determined based on network utilization, and wherein the state of the network is unacceptable in response to the network utilization being between 70-100%.

6. The method according to claim 1, further comprising:
rejecting the throughput test in response to the determined state being unacceptable for performing the throughput test when the request is received;
sending a response to the request rejecting the throughput test.

7. The method according to claim 6, further comprising:
sending an alert to a user indicating a congestion threshold has been exceeded, wherein the authorizing is performed based on user input from a user.

8. The method according to claim 1, wherein the receiving, determining, authorizing, and pausing are performed by a test controller that manages testing for one or more networks.

9. The method according to claim 8, wherein the test controller is an edge device within the one or more networks.

10. The method according to claim 1, wherein the throughput test is an RFC 2544 test.

11. The method according to claim 1, further comprises:
reauthorizing the throughput test in response to the test controller determining the state of the network is acceptable for the throughput test and transmitting the packets from a queue of the edge device of the network.

12. The method according to claim 1, wherein the throughput test is paused in response to determined state being unacceptable.

13. A system for authorizing bandwidth testing in a network of a first service provider, the system comprising:
a network operable to facilitate communications between a plurality of nodes;
a test controller in communication with the network, the test controller being operable to receive a request to perform a bandwidth test from one or more of the plurality of nodes, the test controller being operable to determine whether one or more portions of the network are congested, the test controller being operable to authorize the throughput test in response to the network congestion being below a threshold, and the test controller being operable to suspend the throughput test from the one or more of the plurality of nodes in response to the network congestion being above the threshold, wherein suspending the throughput test includes queuing packets associated with the throughput test at an edge device of the network, the edge device of the network in communication with a second edge device of a second network of a second service provider, wherein the edge device of the network queues the packets associated with the throughput test received from the second network in a queue to prevent further degradation of the network, wherein the throughput test is reauthorized to the one or more of the plurality of nodes in response to the network congestion returning below the threshold and communicating the packets in the queue for resuming the throughput test.

14. The system according to claim 13, wherein the congestion of the network is determined by one or more devices in the network in response to information regarding network utilization, wherein the test controller manages test traffic for the network.

15. The system according to claim 13, wherein the test controller pauses all test traffic in the network in response to the network congestion being equal to or greater than the threshold.

16. The system according to claim 13, wherein one or more edge devices within the network associate each of a plurality of packets with a test pattern when entering the network.

17. A network node comprising:
a processor for executing a set of instructions; and
a memory for storing the set of instructions, wherein the set of instructions being executed to:
receive a request to perform a throughput test over a network of a first service provider from one or more testing clients;
determine a state of the network utilizing indicators received from a plurality of portions of the network;
authorize the throughput test in response to the determined state of the network being acceptable for performing the throughput test;
register the one or more testing clients with a test controller in response to the test controller authorizing the throughput test; and
pause the throughput test through the one or more testing clients registered with the test controller in response to the determined state of the network being unacceptable for performing the throughput test, wherein pausing the throughput test includes queuing packets associated with the throughput test at an edge device of the network, the edge device of the network in communication with a second edge device of a second network of a second service provider, wherein the edge device of the network queues the packets associated with the throughput test received from the second network in a queue to prevent further degradation of the network.

18. The network node according to claim 17, wherein the set of instructions sends a notification to a sending device that the throughput test has been paused.

19. The network node according to claim 17, wherein the set of instructions are further configured to: reauthorize the throughput test in responses to the test controller determining the state of the network is acceptable for the throughput test, and communicate the packets in the queue for resuming the throughput test.

20. The network node according to claim 17, wherein the set of instructions are further operable to:

reject the throughput test in response to the determined state being unacceptable for performing the throughput test when the request is received; and send a response to the a requesting device indicating rejection of the throughput test.

* * * * *